Nov. 19, 1963    M. TEN BOSCH ETAL    3,111,035
ACCELEROMETER
Filed June 5, 1959    4 Sheets-Sheet 1
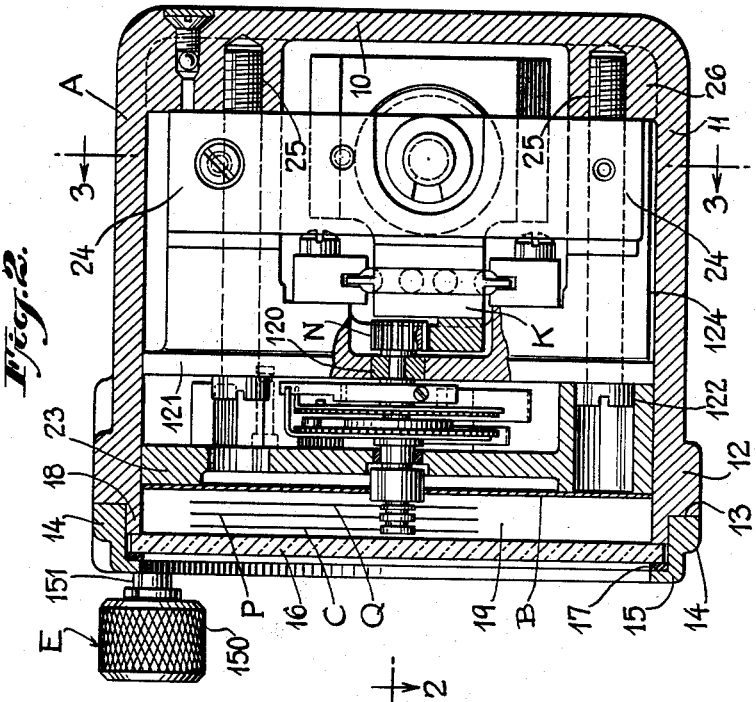
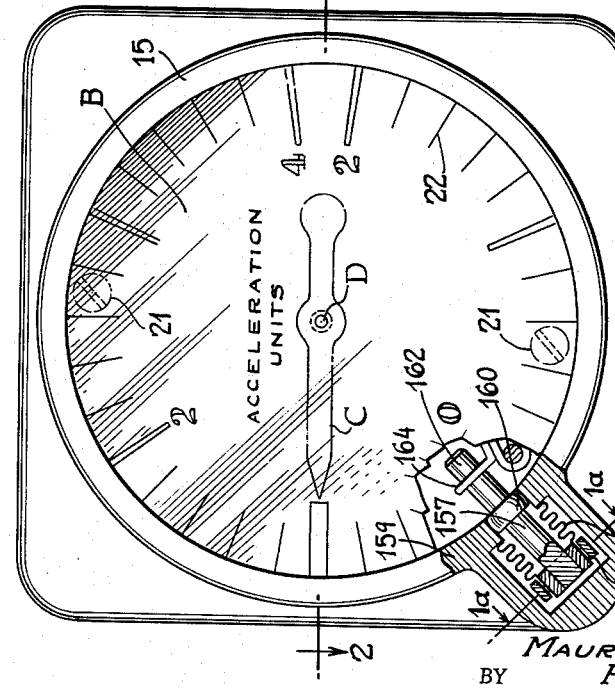
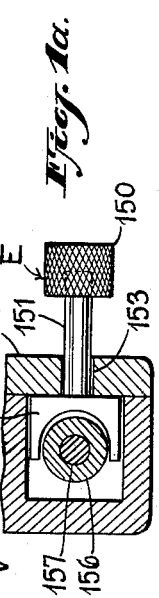
INVENTORS.
MAURITS TEN BOSCH,
PAUL LANG.
BY
ATTORNEY.

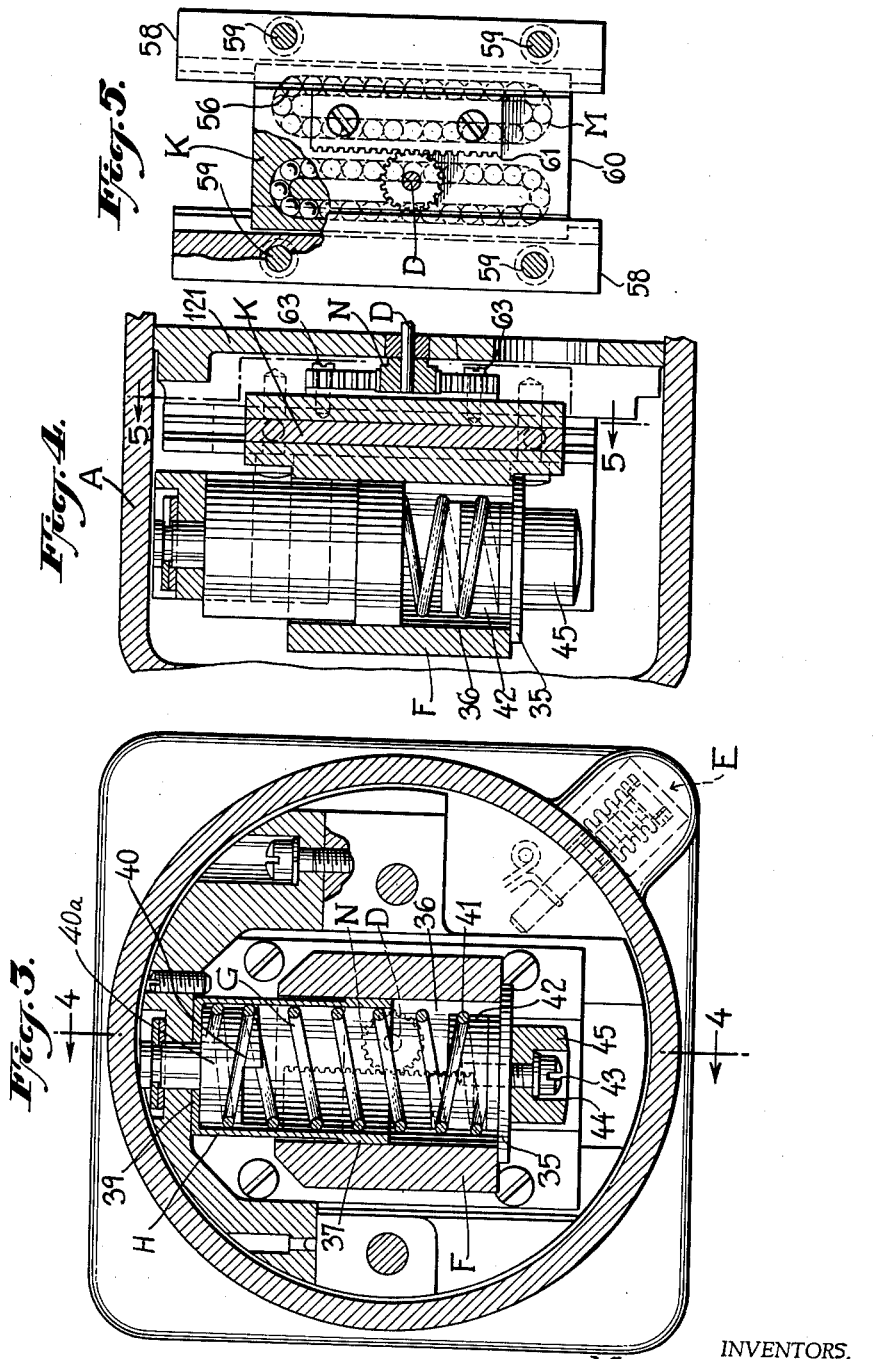

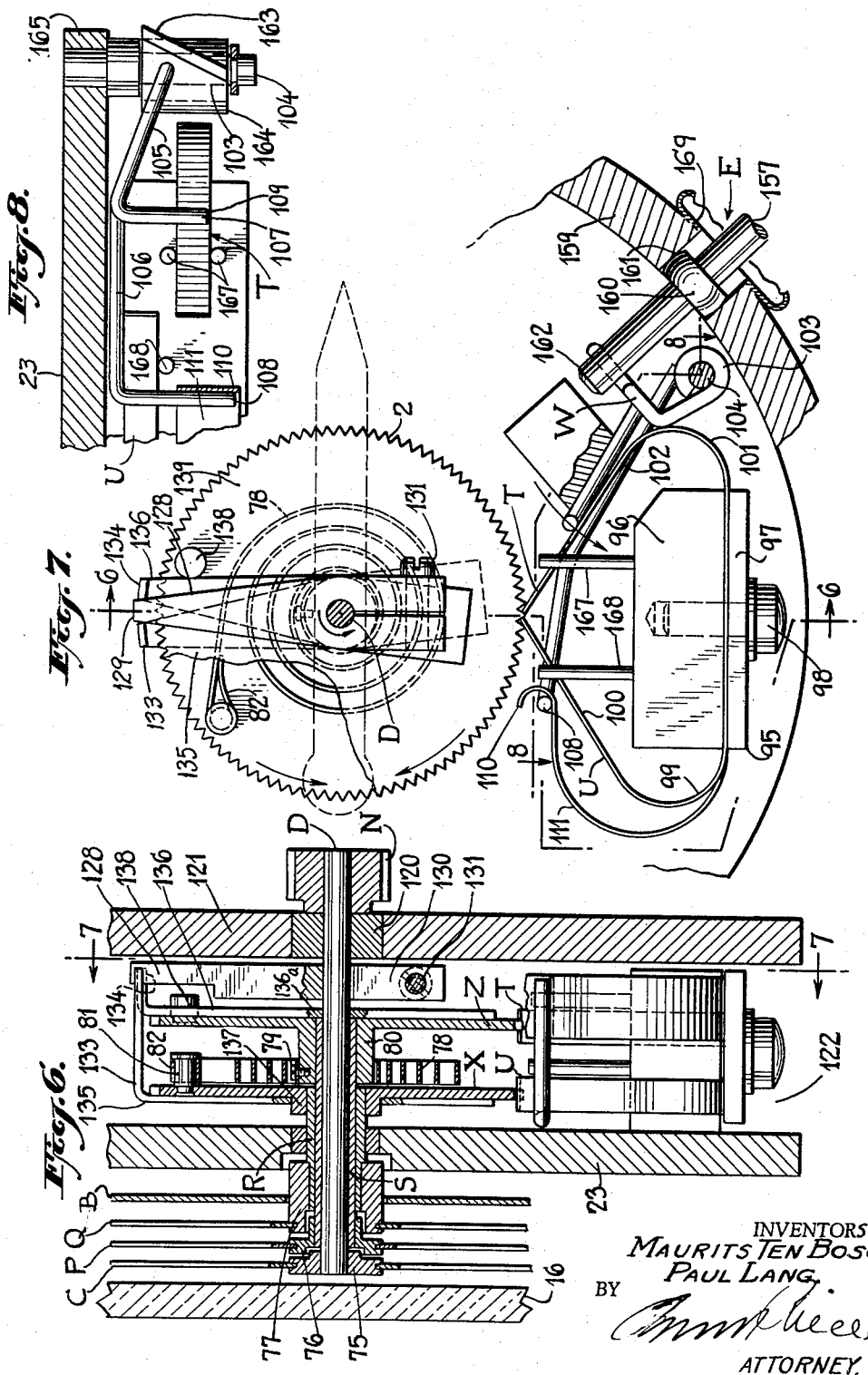

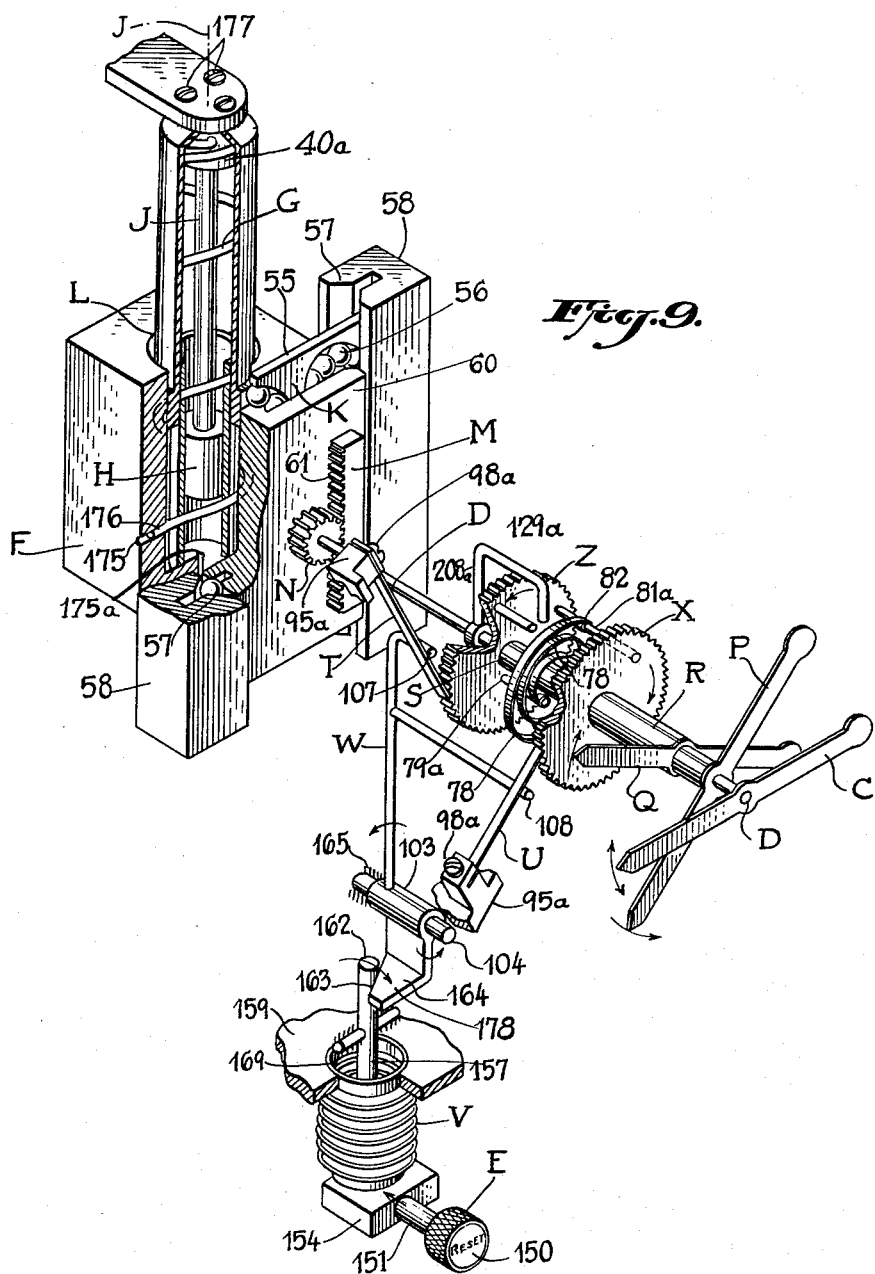

3,111,035
ACCELEROMETER

Maurits ten Bosch, White Plains, and Paul Lang, Katonah, N.Y., assignors to M. ten Bosch, Inc., Pleasantville, N.Y., a corporation of New York
Filed June 5, 1959, Ser. No. 818,277
13 Claims. (Cl. 73—492)

The present invention relates to an accelerometer and it particularly relates to an aircraft accelerometer.

Although not limited thereto, the present invention will be particularly described in its application to pilot warning aircraft accelerometer.

It is among the objects of the present invention to provide an indicating accelerometer particularly designed for aircraft and for pilot warning arrangements in which there will be reliable indication of the acceleration, with a minimum of moving parts and a maximum reliability over a long range of operating conditions.

Another object is to provide a compact accelerometer arrangement particularly designed for aircraft which will accurately function over a wide range of conditions to give adequate warning to the pilot of the amount of acceleration.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In the preferred construction according to the present invention there is provided an indicating accelerometer with a damped spring mass system which will sense accelerations along one axis and transform the resultant linear displacement into a rotary motion of a pointer in front of a dial calibrated in $g$ units.

In the preferred arrangement, additional indications may be provided by auxiliary pointers to indicate maximum instantaneous displacement of the mass in both directions along the sensing axis.

Preferably the entire mechanism may be housed in a very small casing, and such casing may be hermetically sealed and filled with a dry, inert gas to include the effects of ambient conditions.

Essentially, the system consists of a mass which may take the form of a rectangular metallic block mounted upon a ball slide which is guided by a pair of V-notched rails securely fastened to the housing or container.

By this arrangement it is possible to move the mass with extremly low friction, even under extremely high lateral accelerations.

An accurate spring is provided, having essentially a zero thermal-elastic coefficient, and one end of this spring is secured to the housing while the other end is secured to the mass.

There is also provided a damping piston which is fitted into a bore inside of the mass.

An adjustable orifice associated with the damping bore or cylinder will control the degree of damping.

The damping system will utilize the same gas as enclosed in the housing.

A gear rack will also be provided in the preferred structure which moves with the ball slide, driving a gear from said gear rack which will rotate the main pointer shaft.

Thus the main pointer shaft will give an angular indication proportionately to the mass displacement, which is a function of acceleration and frequency.

The auxiliary pointers may be mounted on concentric hollow shafts encircling the main pointer shaft.

Each concentric hollow shaft may be provided with a disc with ratchet teeth or gear teeth thereon. Each ratchet disc may be provided with a pin engaged by an arm attached to the main pointer shaft so that one of the auxiliary pointers will be carried along over a particular direction of the main pointer shaft rotation.

Associated with each ratchet disc mounted on each of said concentric shafts is a leaf spring anchored at one end of the housing with the other end engaging the ratchet teeth or gear teeth and maintaining the auxiliary pointers at the displaced position.

The reset mechanism consists of a yoke which is actuated by a reset push button. This push button and yoke will, in a preferred embodiment, engage the closed end of a metallic bellows which serves as a hermetic seal and a flexible member to rock the pivoted rod connected to the closed end of the bellows.

The other end of the pivoted rod, away from the closed end of the bellows, engages a cam and transforms the motion of the rod about its pivot into the rotation of the spring release arm.

The release arm may have two pins or extensions to lift or remove the leaf springs which serve as detents for the ratchet discs on the concentric shaft cylinders, and this in turn will permit spiral or hair springs to return the auxiliary pointers to alignment with the main pointer.

The arrangement shown will accurately indicate accelerations from $+4g$ to $-2g$ and the damping will be 0.6 of the critical value.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a front elevational view of an accelerometer casing showing the dial and main pointer.

FIG. 1a is a fragmentary view taken in section along the line 1a—1a of FIG. 1.

FIG. 2 is a transverse sectional view upon the line 2—2 of FIG. 1.

FIG. 3 is a transverse vertical sectional view upon the line 3—3 of FIG. 2.

FIG. 4 is a transverse vertical sectional view upon the line 4—4 of FIG. 3.

FIG. 5 is a fragmentary transverse sectional view upon the line 5—5 of FIG. 4.

FIG. 6 is a transverse vertical sectional view through the main pointer shaft taken upon the line 6—6 of FIG. 7.

FIG. 7 is a transverse vertical sectional view upon the line 7—7 of FIG. 6.

FIG. 8 is a fragmentary transverse sectional view upon the line 8—8 of FIG. 7.

FIG. 9 is a diagrammatic lay-out of the system where the various parts are put in separated position, as compared to FIGS. 1 to 8, more clearly to show their interrelationship.

Referring to FIGS. 1 and 2, there is shown a housing A with a front dial B and a main pointer C. The main pointer C is carried on the main pointer shaft D.

The front of the dial has a reset button E at one corner of the housing.

The internal structure is best shown in FIG. 9. In FIG. 9 there is shown a main mass F which is associated with the spring G and the damping piston H. The main sensing axis is indicated at J.

The mass F moves upon the ball slide arrangement K, which has low friction, even under high accelerations. The piston H will ride in a bore L of the mass.

The rack M will move with the ball slide K and it will drive the gear N connected to the main pointer shaft D. This arrangement will cause the shaft D and the pointer C to give an angular indication proportionally to the mass displacement, which is a function of acceleration and frequency.

There will be two auxiliary pointers P and Q which fit upon the concentric tubular shafts R and S respectively.

These shafts R and S are provided with spring pawl arrangements T and U to hold the shafts in position.

These shafts R and S may be reset through the ready set button E, the bellows V and the release arm W. The release arm W will release the spring pawls T and U restraining the ratchet wheels or discs or gear wheels X and Z.

Referring to FIGS. 1 and 2, the housing A has a back section with the back wall 10 and the side wall 11. The front portion of the side wall 11 is enlarged at 12 and provided with a shoulder 13 to receive the inturned edge 14 of the front ring member 15.

The front ring member 15 carries the window glass 16 which is pressed against the annular gasket 17. The other side of the circular transparent glass or plastic disc 16 is held against the cylindrical projection portions 18 of the housing 11.

In the chamber 19 in back of the transparent disc 16 will be the graduated dial B, which is held in position by means of the screws 21 and is graduated as indicated at 22 in g units.

In the space 19 will be positioned a main pointer C, and to the rear of it the auxiliary pointers P and Q.

The dial plate B is mounted upon the internal structural member 23, which has the through bolt connections 24 to sockets 25 in the enlarged base portion 26 extending inwardly from the rear wall 10.

The mass F will be positioned at the rear of the casing A, as best shown in FIG. 3. The bore L of mass F will be closed at one end by the disc 35 (see FIG. 3), and receives one end 37 of the damping piston H.

The damping action is due to the close fit without friction between the piston H and the bore L of the weight or mass F. The disk 35 is connected to the base of the weight F which is suspended by the spring G with the movement being controlled by the linear bearing K shown in FIG. 5.

The damping piston H has a closed end portion 39. One end of the spring 40 is anchored to the plug 40a. The spring G at its other end 41 encircles the plug 42, which plug is held in position by means of the screw or bolt 43, the head of which rests in the recess 44 in the cap piece 45.

Mounted on one side of the weight F is the ball bearing slide arrangement K. The ball bearing slide arrangement K has a retainer plate 55 which encircles the two ball bearings 56 (see also FIG. 9). These ball bearings ride in the grooves 57 of the fixed side structures 58 (see FIGS. 5 and 9).

These side structures 58 are connected by means of the bolts 59 to the plate 121. The central plate member 60, which moves with the weight F, has mounted on it the rack M (see FIGS. 5 and 9).

The rack M is provided with the teeth 61 on one side thereof which mesh with the pinion N on the shaft D, which is the main pointer shaft. The rack M is connected to the plate 60 by the bolts 63 (see FIG. 4).

Referring to FIGS. 6 to 9, there are shown the concentric shafts R and S which encircle the main shaft D. The main pointer C is held on the central shaft D by means of the plug member or central member 75 (see FIG. 6).

The pointer member P is held on the intermediate concentric shaft S by the sleeve or plug member 76, while the rearmost pointer Q is held on the concentric shaft R by the end member or plug member 77 (see also FIG. 6).

The inside ends of the concentric shafts carry the ratchet or gear wheels X and Z respectively (see FIGS. 6 and 9), between which is positioned the coil spring 78.

The coil spring 78 is fixed by the rivet 79 at one end to the bearing structure 80 at the center of the ratchet wheel Z, and at its other end it is fixed to the stud 81 which is mounted upon the ratchet wheel X.

The spring leaf pawl members U and T respectively cooperate with the ratchet wheels X and Z.

As indicated in FIG. 7, the other end of the coil spring 78 is looped at 82 around the stud 81, which may take the form of a shaft if desired, as shown at 81a in FIG. 9.

Referring to the lower part of FIGS. 6 and 7, the ratchet spring pawls are shown as mounted upon the block structure 95 and clamped between the upper portions 96 and the lower portion 97 by means of the bolt 98. The ratchet pawl U extends in a curve, as indicated at 99, and then upwardly obliquely to the right, as indicated at 100.

The ratchet pawl T extends from the other end of the block structure 95 and curves as indicated at 101 upwardly and to the left, as indicated at 102.

The spring release arm, or the pawl release arm W, has a sleeve mounting 103 on the stud or shaft 104, and it carries the arms 105 and 106 which respectively have the in-turned portions 107 and 108, which contact the pawl T at 109 (see FIG. 8) and engage the curved portion 110 which is at the terminal part of the semi-circular spring element 111, which normally holds the arm 108 out of contact with the spring pawl U.

The shaft D will have a bearing 120 in the plate 121 which separates the compartment 122 of the meter casing (see FIG. 2) from the rearmost compartment 124.

Clamped on to the shaft D will be the split portion 130 of the arm 128 clamped in position by means of the bolt or screw 131. The arm 128 will turn in either direction indicated by the arrow 132.

This will cause the arm 128 at its end 129 to contact the end portions 133 and 134 of the arm 135 and 136.

As shown in FIG. 6, the arm 135 extends downwardly and is mounted on the hub 137 on the ratchet X. The arm 136 on the other hand, is mounted at 136a on the shaft D. The stud 138 extends inwardly from the face 139 of the ratchet wheel Z to contact the arm 136.

In the end of the shaft D on the right side of the separating partition 121 will be the pinion N which is driven by the rack M, as indicated best in FIG. 9.

The reset button structure E is best shown in the lower right hand corner of FIG. 1, in FIG. 1a, at the upper left hand corner of FIG. 2, at the lower right hand corner of FIG. 3, at the lower right hand corner of FIG. 7, at the right of FIG. 8, and at the bottom of FIG. 9.

As indicated, it consists of a cylindrical member 150 mounted upon a shaft 151 and projecting forwardly of the front frame 152 of the meter. The shaft 151 extends through the opening 153 in the corner portion of the frame 152 and its acts upon the yoke 154 which in turn acts upon the end of the bellows V (see FIGS. 1 and 9).

The shaft 157 with an enlargement 158 carries the enlargement 160, which rests in the hole 161 in the housing 159.

The end 162 of the shaft 157 will act on the oblique cam face 163 of the cam element 164. The cam element 164 will rotate the sleeve 103 on the pivot 104 to swing the reset or spring release arms W, having the elements 105—106—107—108, as shown in FIG. 8, to reset the auxiliary pointers P and Q together.

The stud shaft 104 is mounted at 165 in the plate 23.

The spring pawl T may be held in position by the pins or studs 167, while the spring pawl U will be held in position by the pin or stud 168, both of which are mounted upon the block structure 95.

The bellows V will make an airtight connection at the opening 169 in the wall portion 159 in the front part of the housing. In operation the reciprocatory mass F which receives the damping spring D and the dashpot plunger H will be permitted to reciprocate in the axis along which accelerations are to be sensed.

The oscillating linear or longitudinal motion of the weight F along the longitudinal axis J will be transformed into rotary motion of the shaft D along an axis which is at right angles to the axis J. This is accomplished by having the plate portion 60 with the ball bearings 56 mounted to reciprocate the rack 61 to rotate the pinion N, which in turn will rotate the pointer C.

This pointer C will move on the dial B, as shown in FIG. 1, to indicate acceleration units. The auxiliary pointers P and Q will indicate the maximum instantaneous displacement of the mass F in both directions along the sensing axis J.

The housing A will be hermetically sealed and it will be filled with a dry, inert gas to exclude any outside influences.

The ball bearing slides 56—57—57—60 will give extremely low friction, even under high lateral accelerations.

The spring G is accurately calibrated, and, while one end 176 is fastened to the mass at 175 in FIG. 9, the other end will be fastened to the plug 42 which will be mounted upon the top plate by means of the screws 177 (see FIGS. 3, 4 and 9).

The damping piston H, as shown in FIG. 9, extends inside of the bore L. The damping system will utilize the gas enclosed by the housing.

At the bottom of the cylinder or bore H, there is an adjustable orifice 175a which may be achieved by conventional means.

The displacement of the pointer C in the ararngement shown will give an angular indication which is proportional to the mass displacement, which is a function of both mass and frequency.

The hollow shafts R and S are respectively accurate, the auxiliary pointers P and Q will be held in position by the ratchet wheels X and Z, and the spring leaf pawls U and T.

These leaf springs T and U serving as pawls are mounted at the blocks 95 to the housing casing and they will hold the pointers P and Q through the ratchet wheels X and Z to displaced position.

The reset mechanism E has a sealed connection by the bellows V to the housing A, and it is provided with the swinging connections acting upon the push rod 151 to move the rod 157, and particularly the end 162 of the rod, against the oblique cam surface 163.

This movement, which will take place as indicated by the arrow 178 (see FIG. 9), will cause the cam 164 to actuate the levers W and their arms 103 and 107 to disengage the spring pawls T and U from the ratchet wheels Z and X and permit the auxiliary pointers Q and P to be reset to the same position as the pointer C.

This will be accomplihsed by the spiral coil spring 78, which is biased to turn both of the auxiliary points P and Q through the shafts R and S and the ratchet wheels X and Z to a position of alignment with the main pointer C.

As many changes could be made in the above accelerometer, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, What is claimed is:

1. A viscous damped spring-reciprocating mass type accelerometer for sensing accelerations along one axis and transforming the resultant linear displacement into rotary movement indicating g units of acceleration, said accelerometer having a hermetically sealed housing filled with a dry, inert gas, a reciprocating mass mounted to oscillate on a sensing axis, a coil spring and dashpot piston associated with said mass to oscillate on the same axis, a linear ball slide bearing mounted on the side of the mass to hold said mass and said piston in alignment on the sensing axis without frictional contact, a gear rack and meshing pinion to convert said oscillation on said sensing axis into rotary motion and a pointer dial system to indicate the acceleration of said mass in g units, said piston being of inverted cup shape and having an enlarged diameter cylinder end portion and said mass having a cylindrical bore therethrough closely fitting around said enlarged diameter cylindrical portion without frictionally contacting said bore and said rack and pinion being mounted on and alongside of said slide bearing.

2. A viscous damped spring reciprocating mass type accelerometer for sensing accelerations along one axis and transforming the resultant linear displacement into rotary movement indicating g units of acceleration, said accelerometer having a hermetically sealed housing filled with a dry, inert gas, a reciprocating mass mounted to oscillate on a sensing axis, a coil spring and dashpot piston associated with said mass to oscillate on the same axis, a linear ball slide bearing mounted on the side of the mass to hold said mass and said piston in alignment on the sensing axis without frictional contact, a gear rack and meshing pinion to convert said oscillation on said sensing axis into rotary motion and a pointer dial system to indicate the acceleration of said mass in g units, said accelerometer also being provided with auxiliary pointers to indicate the maximum instantaneous displacement of said mass in both directions along the sensing axis, and means to hold said pointers in said last mentioned indicating positions, said piston being of inverted cup shape and having an enlarged diameter cylinder end portion and said mass having a cylindrical bore therethrough closely fitting around said enlarged diameter cylindrical portion without frictionally contacting said bore and said rack and pinion being mounted on and alongside of said slide bearing.

3. A viscous damped spring reciprocating mass type accelerometer for sensing accelerations along one axis and transforming the resultant linear displacement into rotary movement indicating g units of acceleration, said accelerometer having a hermetically sealed housing filled with a dry, inert gas, a reciprocating mass mounted to oscillate on a sensing axis, a coil spring and dashpot piston associated with said mass to oscillate on the same axis, a linear ball slide bearing mounted on the side of the mass to hold said mass and said piston in alignment on the sensing axis without frictional contact, a gear rack and meshing pinion to convert said oscillation on said sensing axis into rotary motion and a pointer dial system to indicate the acceleration of said mass in g units, said accelerometer also being provided with auxiliary pointers to indicate the maximum instantaneous displacement of said mass in both directions along the sensing axis, and means to hold said pointers in said last mentioned indicating positions and manual means to reset said auxiliary pointers to alignment with the first mentioned pointer dial system, said piston being of inverted cup shape and having an enlarged diameter cylinder end portion and said mass having a cylindrical bore therethrough closely fitting around said enlarged diameter cylindrical portion without frictionally contacting said bore and said rack and pinion being mounted on and alongside of said slide bearing.

4. A viscous damped spring reciprocating mass type accelerometer for sensing accelerations along one axis and transforming the resultant linear displacement into rotary movement indicating g units of acceleration, said accelerometer having a hermetically sealed housing filled with a dry, inert gas, a reciprocating mass mounted to oscillate on a sensing axis, a coil spring and dashpot piston associated with said mass to oscillate on the same axis, a gear rack and meshing pinion to convert said oscillation on said sensing axis into rotary motion and a pointer dial system to indicate the acceleration of said mass in *g* units, said gear rack and meshing pinion being provided with an elongated ball slide to permit high lateral acceleration with extremely low friction, said piston being of inverted cup shape and having an enlarged diameter cylinder end portion and said mass having a cylindrical bore therethrough closely fitting around said enlarged diameter cylindrical portion without frictionally contacting said bore and said rack and pinion being mounted on and alongside of said slide bearing.

5. A viscous damped spring reciprocating mass type accelerometer for sensing accelerations along one axis and transforming the resultant linear displacement into rotary movement indicating *g* units of acceleration, said accelerometer having a hermetically sealed housing filled with a dry, inert gas, a reciprocating mass mounted to oscillate on a sensing axis, a coil spring and dashpot piston associated with said mass to oscillate on the same axis, a linear ball slide bearing mounted on the side of the mass to hold said mass and said piston in alignment on the sensing axis without frictional contact, a gear rack and meshing pinion to convert said oscillation on said sensing axis into rotary motion and a pointer dial system to indicate the acceleration of said mass in *g* units, said coil spring and said dashpot being positioned in a central opening through said mass, aligned with said sensing axis, said piston being of inverted cup shape and having an enlarged diameter cylinder end portion and said mass having a cylindrical bore therethrough closely fitting around said enlarged diameter cylindrical portion without frictionally contacting said bore and said rack and pinion being mounted on and alongside of said slide bearing.

6. A viscous damped spring reciprocating mass type accelerometer for sensing accelerations along one axis and transforming the resultant linear displacement into rotary movement indicating *g* units of acceleration, said accelerometer having a hermetically sealed housing filled with a dry, inert gas, a reciprocating mass mounted to oscillate on a sensing axis, a coil spring and dashpot piston associated with said mass to oscillate on the same axis, a linear ball slide bearing mounted on the side of the mass to hold said mass and said piston in alignment on the sensing axis without frictional contact, a gear rack and meshing pinion to convert said oscillation on said sensing axis into rotary motion and a pointer dial system to indicate the acceleration of said mass in *g* units, said pointer dial being provided with a mass pointer and a plurality of auxiliary pointers, the latter to indicate maximum instantaneous displacement of the mass in both directions and each of said auxiliary pointers being provided with a ratchet and pawl means to hold said ratchet in position, said piston being of inverted cup shape and having an enlarged diameter cylinder end portion and said mass having a cylindrical bore therethrough closely fitting around said enlarged diameter cylindrical portion without frictionally contacting said bore and said rack and pinion being mounted on and alongside of said slide bearing.

7. A viscous damped spring reciprocating mass type accelerometer for sensing accelerations along one axis and transforming the resultant linear displacement into rotary movement indicating *g* units of acceleration, said accelerometer having a hermetically sealed housing filled with a dry, inert gas, a reciprocating mass mounted to oscillate on a sensing axis, a coil spring and dashpot piston associated with said mass to oscillate on the same axis, a linear ball slide bearing mounted on the side of the mass to hold said mass and said piston in alignment on the sensing axis without frictional contact, a gear rack and meshing pinion to convert said oscillation on said sensing axis into rotary motion and a pointer dial system to indicate the acceleration of said mass in *g* units and a reset mechanism provided with a reset push button to release said pawls and a coil spring means to reset said auxiliary pointers to alignment with the main pointer, said piston being of inverted cup shape and having an enlarged diameter cylinder end portion and said mass having a cylindrical bore therethrough closely fitting around said enlarged diameter cylindrical portion without frictionally contacting said bore and said rack and pinion being mounted on and alongside of said slide bearing.

8. A viscous damped accelerometer of the damped spring suspended mass type enclosed in a hermetically sealed housing, comprising a reciprocating rectangular metal block having a cylindrical bore therein serving as the mass, linear ball slides for the block positioned alongside of the block having guide rolls parallel to the axis of the bore to hold the mass in alignment and to cause the mass to move in alignment without lateral play, an inverted cup-shaped damping piston having an enlarged peripheral cylindrical edge portion closely fitting within said bore, but spaced from the interior of said bore, with the spacing being so minute as to maintain a narrow annular gap having a damping effect, a spring extending through said piston and bore and suspending said block, a gear rack including a pinion and rack, said rack moving with the block and said pinion being rotated with movement of the block mounted on the side of the guide rails, pointer shafts connected to and rotated by said pinion, ratchet disks mounted on said shafts, coil spring means connected to said pointer shafts to return them to zero position and oppositely directed spring leaf pawls to engage said disks and hold them in indicating position and rod means to contact said spring pawls and simultaneously release them and permit said coil spring means to return the pointer shafts to zero position.

9. The accelerometer of claim 8, a reset mechanism having a yoke to operate said rod means and a push button on the exterior of the accelerometer and a bellows connecting said push button to said accelerometer to maintain the seal.

10. The accelerometer of claim 8, said spring leaf pawls being positioned on a block fixed in position below the ratchet disks and said accelerometer being provided with three chambers, a rear chamber containing the mass, the piston and in forward direction the ball slides and the rack and pinion; and an intermediate chamber containing the coil spring means, ratchet disks and leaf pawls and a front chamber containing the end of the pointer shafts and the indicating points and said front chamber also carrying a reset push button mechanism.

11. An indicating accelerometer having a damped spring mass system sensing acceleration along one axis and transferring the resultant linear displacement onto a rotary motion of a pointer in front of a dial calibrated in *g* units comprising a hermetically sealed housing filled with a dry inert gas, a reciprocable metallic block mass, a ball slide fixed to said mass, a pair of V-notched rails, means securing said rails securely to the interior of said housing, said ball slide being slidingly engaged by said notched rails, a zero thermal elastic coefficient spring one end of which spring is secured to the housing while the other end is secured to the mass, said mass having a central cylindrical bore, an air damping piston closely fitted into said bore, an adjustable orifice arrangement associated with the damping piston, a gear rack fixed to said ball slide and movable therewith, a main pointer shaft, a gear driven by said gear rack driving said main pointer shaft, a pointer driven by said main pointer shaft to give an angular indication proportionately to the mass displacement to indicate acceleration, concentric hollow shafts mounted around and encircling the main pointer shaft and auxiliary pointers mounted in said concentric shafts.

12. The accelerometer of claim 11, each hollow shaft being provided with a toothed ratchet disc, pin and arm combinations attached to the main pointer shaft and associated with each one of said ratchet discs to cause one of the auxiliary pointers to be carried along with the main pointer shaft rotation, leaf spring means associated with each ratchet disc to engage the teeth of the ratchet disc and maintain the auxiliary pointers in displaced position.

13. The accelerometer of claim 12, a reset mechanism having a yoke, reset push button actuating said yoke, a hermetically sealed metallic bellows enclosing the reset mechanism, a pivoted rod actuated by said yoke, a cam actuated by said rod, and a leafspring release arm actuated by said cam.

References Cited in the file of this patent

UNITED STATES PATENTS

| | | |
|---|---|---|
| 1,155,471 | Davis | Oct. 5, 1915 |
| 2,262,007 | Kollsman | Nov. 11, 1941 |
| 2,394,974 | Bevins | Feb. 19, 1946 |
| 2,455,356 | Crede | Dec. 7, 1948 |
| 2,752,466 | Bonnell | June 26, 1956 |
| 2,831,670 | Bourns et al. | Apr. 22, 1958 |
| 2,852,243 | Shepard | Sept. 16, 1958 |
| 2,874,711 | Anxionnaz | Sept. 16, 1958 |
| 2,878,775 | Taylor | Mar. 24, 1959 |
| 2,889,181 | Lang et al. | June 2, 1959 |
| 2,929,661 | Brown | Mar. 22, 1960 |

FOREIGN PATENTS

| | | |
|---|---|---|
| 1,059,646 | France | Nov. 10, 1953 |
| 764,388 | Great Britain | Dec. 28, 1956 |
| 240,636 | Switzerland | May 1, 1946 |